United States Patent [19]

Pieper et al.

[11] Patent Number: 5,728,190
[45] Date of Patent: Mar. 17, 1998

[54] MELTING FURNACE AND PROCESS FOR THE INERTIZATION OF HAZARDOUS SUBSTANCES BY VITRIFICATION

[75] Inventors: Helmut Pieper; Lothar Rott; Matjaz Bucar, all of Lohr am Main, Germany

[73] Assignee: Beteiligungen Sorg GmbH & Co. AG, Lohr am Main, Germany

[21] Appl. No.: 577,489

[22] Filed: Dec. 22, 1995

[30] Foreign Application Priority Data

Dec. 25, 1994 [DE] Germany ............... 44 46 576.9

[51] Int. Cl.$^6$ ............................................. C03B 5/027
[52] U.S. Cl. ............... 65/134.4; 65/134.5; 65/134.8; 65/335; 65/337; 65/339; 588/252; 588/256; 588/900
[58] Field of Search ............... 65/134.4, 134.5, 65/134.8, 335, 337, 339; 558/252, 256, 900

[56] References Cited

U.S. PATENT DOCUMENTS

| | | | |
|---|---|---|---|
| 3,208,841 | 9/1965 | Burch | 65/335 |
| 3,294,512 | 12/1966 | Penberthy | 65/134.5 X |
| 3,362,808 | 1/1968 | Lyle | 65/339 |
| 3,375,095 | 3/1968 | Poole | 65/135.5 |
| 3,385,686 | 5/1968 | Plumat et al. | 65/134.5 X |
| 3,482,956 | 12/1969 | Trethewey | 65/134.5 X |
| 3,573,019 | 3/1971 | Rees | 65/134.5 X |
| 3,592,151 | 7/1971 | Webber | 110/243 |
| 4,019,888 | 4/1977 | Verhappen et al. | 65/335 X |
| 4,852,118 | 7/1989 | Pieper | 373/32 |
| 4,882,736 | 11/1989 | Pieper | 373/32 |
| 4,944,785 | 7/1990 | Sorg et al. | 65/136 |
| 4,948,411 | 8/1990 | Pieper et al. | 65/342 |
| 5,032,161 | 7/1991 | Pieper et al. | 65/335 |
| 5,035,735 | 7/1991 | Pieper et al. | 65/134.8 |
| 5,120,342 | 6/1992 | Richards | 65/178 |
| 5,188,649 | 2/1993 | Macedo et al. | 65/21.3 |
| 5,340,372 | 8/1994 | Macedo et al. | 65/21.1 |
| 5,364,426 | 11/1994 | Richards | 65/474 |

FOREIGN PATENT DOCUMENTS

| | | |
|---|---|---|
| OS 1471842 | 8/1970 | Germany. |
| 3912311 | 8/1990 | Germany. |
| WO 93/02974 | 2/1993 | WIPO. |

OTHER PUBLICATIONS

Dr.-Ing. Hans-Joachin Illig, *ABC Glas*, Deutscher Verlag für Grundstoffindustrie Leipzig, 1991—pp. 7, 98.

Publication by L. Penberthy–Fred Scarfe entitled "Electric Boosting and Bubbling for Glass Furnaces", date unknown.

Publication by Pincus entitled "Melting Furnace Design in the Glass Industry" published by Books for Industry and the Glass Industry Magazine, dated 1980.

Publication by Von G. Mayer—Schwinning, et al. entitled "Vitrification Process For The Inertization Of Residual Products During Noxious Gas Removal In Thermal Waste Disposal Units", VGB Kraftwerkstechnik 70 (1990) issue 4, pp. 332–336.

*Primary Examiner*—Donald E. Czaja
*Assistant Examiner*—Sean Vincent
*Attorney, Agent, or Firm*—Hill, Steadman & Simpson

[57] ABSTRACT

A tank furnace for the inertization of non-flammable batch, which contains hazardous substances, metals and less than 10% by weight of carbon, by vitrification with glass forming aggregates by producing a glassy melt. The furnace has a batch charging device and a tank, on the rim of which a furnace crown rests, electrodes for heating the melt, a supply of oxidizing gases to the melt and, as an outlet for the melt, an overflow channel which can be heated. Nozzles are installed in the bottom of the tank to introduce oxidizing gases in order to reduce the eluate values, and the electrodes are immersed in the melt from above. It is preferable to install the nozzles at sloping sidewalls of the tank which slope upwardly and outwardly.

13 Claims, 1 Drawing Sheet

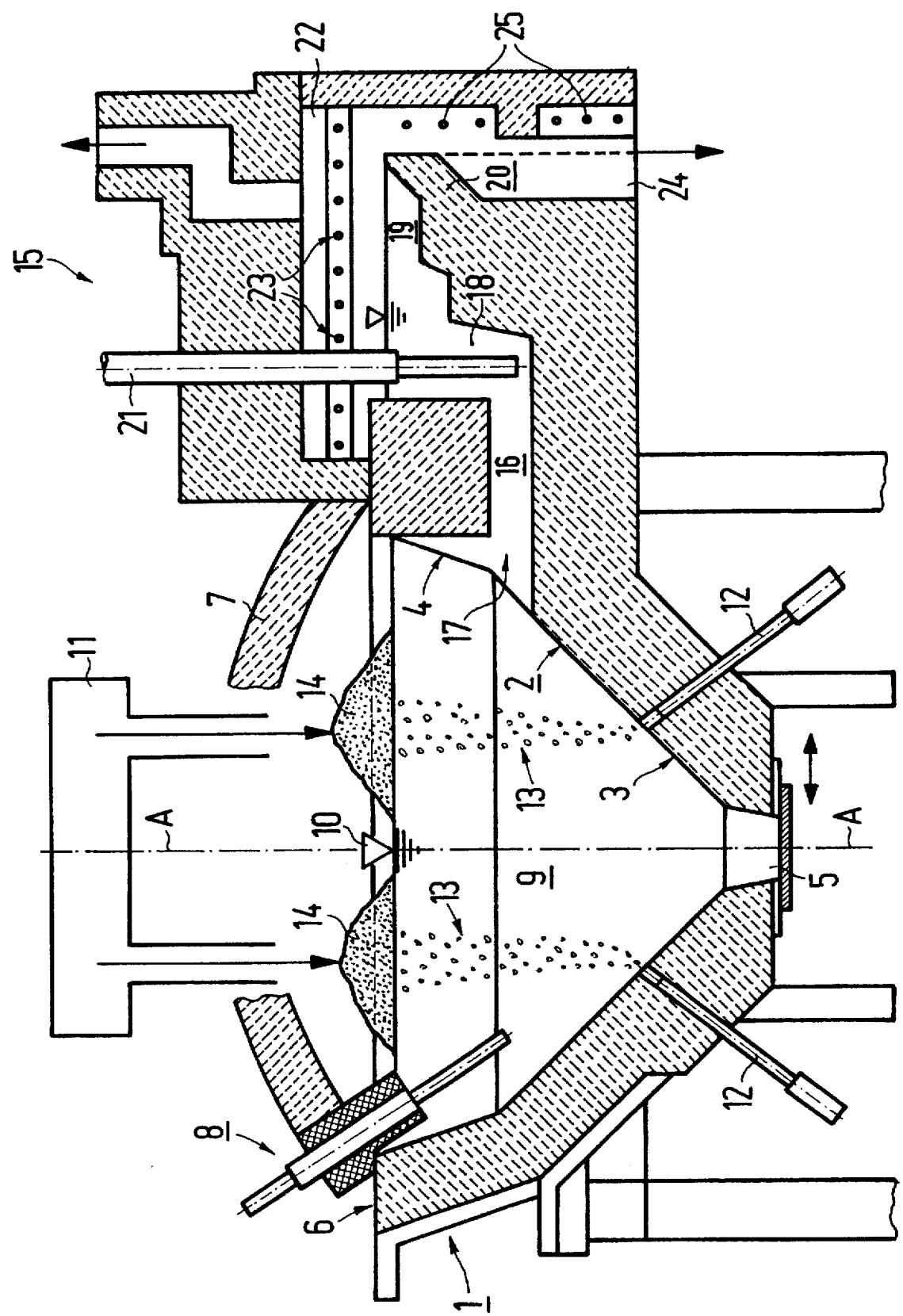

MELTING FURNACE AND PROCESS FOR THE INERTIZATION OF HAZARDOUS SUBSTANCES BY VITRIFICATION

BACKGROUND OF THE INVENTION

The invention concerns a melting furnace for the inertization of non-flammable hazardous charging material containing metals and less than 10% by weight of carbon, by vitrification with glass forming aggregates by producing a glassy melt, with a charging device and a tank on the rim of which rests a furnace crown, with electrodes to heat the melt, with the means to supply oxidizing gases to the melt, and with a heatable overflow channel for draining the melt.

Mayer-Schwinning, et al ("Vitrification process for the inertization of residual products during noxious gas removal in thermal waste disposal units", VGB Kraftwerkstechnik 70 (1990), issue 4, pages 332 to 336) and U.S. Pat. No. 5,035,735; 5,032,161 and 4,944,785 teach the application of tank melting furnaces for vitrification purposes. However, these furnaces do not possess a means for introducing oxidizing gases into the glass melt.

The vitrification of environmentally hazardous waste materials has proved to be an extremely safe conservation method for such waste materials, but certain conditions must be maintained during the process, so that the long term success of the vitrification is not compromised. A possible weakness of vitrification is the release of soluble components by washing out with water, a process also described as elution. The degree of elution depends on, amongst other factors, the concentration of the soluble materials and their intrinsic solubility, but also on the specific surface of the glass mass (broken or ground glass) and on the atomic structure of the glass (crystalline, amorphous).

The above-mentioned paper by Mayer-Schwinning, et al describes several elution analysis and demonstrates that, on the whole, the concentrations of contaminants in the eluates conform with the legal standards and regulations.

Contaminants of the type mentioned above often contain more or less carbon, whereby the carbon content is usually between 3 and 4 weight percent, but on occasions can be as much as 10 weight percent. This carbon is formed when power stations and refuse incineration units operate with under stoichiometric combustion, in order to keep the $NO_x$ content as low as possible. This leads to the formation of carbon in the form of very fine particles. In addition, carbon dust, produced by grinding active carbon contaminated with other environmental poisons, including heavy metals and heavy metal compounds, is also occasionally blown into such units. The heavy metals producing the highest level of contamination are copper, zinc, iron, nickel and lead.

However, the presence of carbon in the melt leads to reduction processes and is counter productive, as it leads to the separation of the metals, part of which at least remain in colloidal solution in the melt. Such metallic constituents in the melt can be washed out, i.e., eluted, when the glass is deposited at a land fill site, and are therefore a risk to the environment. This behavior is examined in the elution analysis mentioned above, and such tests have shown that the elution values for heavy metals increase following vitrification carried out under reducing conditions.

U.S. Pat. No. 3,592,151 describes a refuse incinerator in the form of a shaft, in which glass is placed in the bottom, heated by immersed electrodes and, if necessary, by fossil fuel burners, and maintained in a molten state. Refuse, with a random composition, is burned above the molten glass, which acts as a replacement for a conventional grate. In this process non-volatile and partially dangerous combustion products, with the exception of metals, are absorbed by the glass and combine with this to form a slag. Nozzles are used to introduce at least a part of the combustion air through the slag from below, and so this air is preheated. However as large quantities of combustion air are required, equivalent large amounts of heat are removed from the slag. In this process the amount of slag is increased by broken glass from the refuse, so that the additional glass and molten metal must be drained periodically. A reproducible process with controllable low elution values is not mentioned.

The present invention does not concern such a refuse incinerator, but concerns a melting furnace for the disposal of charging material which contains at the most 10 weight percent of carbon, and therefore, in itself, does not constitute a combustible material.

Patent application WO 93/02974 describes a melting furnace of the type described initially, in which oxygen is introduced into the melt, and in which contaminated waste containing organic and/or carbon compounds can be oxidized and vitrified. A charging device for the charging material is installed centrally, i.e., in the furnace axis. Plate electrodes are installed on opposite sides of the furnace below the glass surface. At a distance above the furnace bottom there is at least one horizontal, perforated inconel pipe, which is used to produce a curtain of gas bubbles between the electrodes in order to increase the specific electrical resistance of the melt. The gas bubbles also produce currents in the melt and distribute the charged material, while heating this simultaneously from below, in order to achieve fast melting at relatively low temperatures. However, the perforated pipes cannot be cooled sufficiently, even by the oxygenated gas which flows through, as this would cause blockage of the holes. Therefore, the pipes are subjected to the aggressive effect of the glass and the oxygen at high temperatures, which results in a drastic reduction in the lifetime of the pipes, especially when the amount of oxygen is high. Furthermore, as a result of the relatively high location of the perforated pipes, the lower part of the melt, in which metallic components collect, is not sufficiently included in the circulation and oxidation of the melt, and contains elutable components.

SUMMARY OF THE INVENTION

It is the object of the invention to provide a melting furnace of the type described initially, which can also be operated at high melting temperatures with gases with a high oxygen content and which reduces the formation of eluates from non-oxidized components of the charging material.

This object is achieved according to the invention with the melting furnace described initially, in that nozzles for the introduction of the oxidizing gases are installed in the bottom of the furnace, and electrodes are immersed in the melt from above.

The oxidizing operation, which starts at the bottom, reduces the amount of metal entering a colloidal solution in the melt. Furthermore, the ascending current of gas bubbles improves the homogenization of the complete melt, so that high temperatures can be achieved in an overflow channel for the melt, even when the bath is deep. The ascending gas bubbles produce circulatory movements within the complete melt. Comparative eluate analyses which have been carried out have shown that with furnaces according to the invention, fewer heavy metals and heavy metal compounds can be washed out of the end product.

The installation of nozzles in the furnace bottom means that the melt can be kept at a significantly higher temperature level than in state-of-the-art furnaces, even when oxygen is introduced.

Further advantageous embodiments of the invention are obtained when:

- the nozzles are installed in that part of the inside surface of the furnace bottom which rises from the inside to the outside, as this results in favorable currents in the melt,
- the nozzles are distributed around a closable drain installed in the axis of the furnace as this produces a toroidal current, and
- if the charging unit installed above the furnace crown is designed so that the charging material is added to the melt above the nozzles at a minimum of two locations off center, as this results in a faster distribution of the raw material on the surface of the melt.

BRIEF DESCRIPTION OF THE DRAWINGS

A tank furnace according to the invention will be described in detail below according to the only figure, which shows a vertical section through the furnace and the overflow channel for the melt.

DETAILED DESCRIPTION OF THE PREFERRED EMBODIMENTS

As shown in FIG. 1 the tank 1 has an internal surface 2, which comprises two truncated cones 3 and 4 which abut one another, and which have a common vertical axis A—A. A discharge opening 5 is provided, which is concentric with the above mentioned axis A—A, and through which any metal which collects can be removed. The tank 1 has a rim 6, running round the top, upon which a furnace crown 7 rests. A number of electrodes 8, of which only one is depicted in the figure, are distributed equidistantly around the circumference of the furnace in the area of the joint between the rim 6 and the furnace crown 7, whereby said electrodes are immersed from above into the melt 9, which extends upwards as far as a level 10 determined in the furnace design.

A charging unit 11, which is only shown schematically in the figure, and which is used to feed the charging material in the tank 1, is situated above the furnace crown 7, whereby the charging material comprises the hazardous substances for disposal. If necessary, glass forming aggregates can be added in special cases. No combustion process takes place in the charging unit 11.

Two nozzles 12 are installed in the bottom of the tank 1, which are connected to a supply of oxidizing gas, not shown, and from which a stream of ascending gas bubbles 13 emanate. The design of the charging unit 11 and the distribution of the nozzles 12 are chosen such that the reactive gas bubbles 13 reach the surface of the melt underneath the charging material 14, which floats on the melt. In this way, which is not shown in detail in the figure, the piles of charging material 14 are pushed apart, so that in reality the complete surface of the melt 9 is covered with charging material.

The nozzles 12 are also referred to as bubblers. Although only two such bubblers are shown in the figure, it is of course possible to install numerous such bubblers, distributed around the tank 1. The bubblers produce bubbles, which ascend and cause colder melt from the bottom of the tank 1 to be transported to the top and into the sphere of influence of the electrodes, before returning to the bottom of the furnace. This results not only in a homogenization of the temperature distribution, but also in a more intensive heat transfer from the melt 9 to the charging material 14.

A discharge device 15 is attached to the side of the tank 1, such that the main axis of the discharge device 15 is aligned with a radius of the tank 1. The discharge device 15 includes a horizontal channel 16, the lowest point of the opening 17 of which lies below a horizontal level which is defined by the bottom ends of the electrodes 8. A vertical channel 18 leads from the overflow channel 16 to a horizontal channel section 19, at the end of which a weir 20 is provided, the upper surface of which defines the fluid level of the melt 9. The active end of a further heating electrode 21 is provided in the vertical channel 18. A heating chamber 22, which is mostly open at the bottom, is provided above the vertical channel 18, the horizontal channel section 19 and the weir 20, and in which heating chamber several radiation heating elements 23 in the form of horizontal rods are installed. Further radiation heating elements 25, with the same form of horizontal rods already described, are also installed on the outside of the shaft 24 which leads from the weir 20.

The ascending gas bubbles 13 ensure that a sufficiently high temperature is always maintained in the melt 9 in front of the opening 17, so that a continuous passage of material is assured in accordance with the amount of charging material added. It can be stated that typical quantities for each nozzle 12 lie in the region of approximately 0.5 to 0.6 normal cubic meters of air per hour. Such extremely low volumes of air are not sufficient to support the combustion of larger amounts of refuse; while the introduction of pure oxygen is not permissible for refuse incineration, as the refuse would then burn explosively.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

We claim as our invention:

1. A tank melting furnace for the inertization of non-flammable charging material containing hazardous substances with metallic constituents and less than 10% by weight of carbon, by vitrification with glass forming aggregates by producing a glassy melt, said furnace comprising:
    a tank with a bottom, side walls and a top rim, adapted for retaining said glassy melt and for inertization of hazardous substances by vitrification,
    a furnace crown positioned at said rim,
    batch charging means for introducing non-flammable charging material containing hazardous substances with metallic constituents and less than 10% by weight of carbon into at at least one location in said tank,
    electrodes extending downwardly into an interior of said tank from an upper part thereof for being immersed into and heating said melt,
    means for supplying oxidizing gases into said melt in the form of nozzles provided at said bottom of said tank, and
    an outlet for said melt in the form of an overflow channel which extends radially from said tank and which can be heated.

2. A melting furnace according to claim 1, wherein said side walls slope upwardly and outwardly and said nozzles are positioned in said sloped side walls.

3. A melting furnace according to claim 2, wherein said tank includes a closable discharge opening at a center vertical axis thereof and said nozzles are positioned radially outwards of said discharge opening.

4. A melting furnace according to claim 1, wherein said batch charging means is positioned above said furnace crown and is arranged so that said charging material is added to the melt at at least two off center locations above said nozzles.

5. A tank melting furnace for the inertization of non-flammable charging material containing hazardous substances with metallic constituents and less than 10% by weight of carbon, by vitrification with glass forming aggregates by producing a glassy melt, said furnace comprising:

a tank with a bottom, side walls symmetrically arranged around a central vertical axis and a top rim, adapted for retaining said glassy melt and for inertization of hazardous substances by vitrification, a furnace crown positioned at said rim, charging means for introducing non-flammable charging material containing hazardous substances with metallic constituents and less than 10% by weight of carbon into said tank through said crown at at least one location radially offset from said central vertical axis, electrodes extending downwardly into an interior of said tank, at a junction between said crown and said side walls, for being immersed into and heating said melt, a plurality of nozzles positioned at said bottom of said tank, radially offset from said central vertical axis, for supplying oxidizing gases into said melt, an outlet for said melt in the form of an overflow channel communicating with said tank through at least one of said side walls and extending radially from said tank, and means for heating said overflow channel.

6. A melting furnace according to claim 5, wherein said side walls slope upwardly and outwardly and said nozzles are positioned in said sloped side walls.

7. A melting furnace according to claim 6, wherein said tank includes a closable discharge opening at said center vertical axis thereof and said nozzles are positioned radially outwards of said discharge opening.

8. A melting furnace according to claim 5, wherein said charging material is added to the melt at at least two off center locations vertically in line above said nozzles.

9. A tank melting furnace for the inertization of non-flammable charging material containing hazardous substances with metallic constituents and less than 10% by weight of carbon, by vitrification with glass forming aggregates by producing a glassy melt, said furnace comprising:

a tank with a bottom, upwardly and outwardly sloping side walls symmetrically arranged around a central vertical axis and a top rim, adapted for retaining said glassy melt and for inertization of hazardous substances by vitrification, a furnace crown positioned at said rim, charging means for introducing said charging material containing hazardous substances with metallic constituents and less than 10% of weight of carbon into said tank through said crown at a plurality of locations radially offset from said central vertical axis, electrodes extending downwardly into an interior of said tank, at a junction between said crown and said side walls, for being immersed into and heating said melt, a plurality of nozzles extending through said side walls of said tank, radially offset from said central vertical axis and said discharge opening, for supplying oxidizing gases into said melt vertically in line below said plurality of locations where said charging material is introduced, an outlet for said melt in the form of a horizontal overflow channel communicating with said tank at an inlet in one of said side walls and having a weir at an opposite end of said channel for maintaining a fixed level of glassy melt in said tank, and means for heating said overflow channel to maintain said glassy melt in said channel in a liquid state.

10. A melting furnace according to claim 1, wherein said means for supplying oxidizing gases into said melt is further provided for supplying the oxidizing gases directly below said at least one location where said charging means introduces said charging material into said tank.

11. A melting furnace according to claim 5, wherein said means for supplying oxidizing gases into said melt is further provided for supplying the oxidizing gases directly below said at least one location where said charging means introduces said charging material into said tank.

12. A method of rendering non-flammable charging material containing hazardous substances with metallic constituents and less than 10% by weight of carbon inert by vitrification with glass forming aggregates and producing a glassy melt, said method comprising the steps of:

providing a vitrification—furnace tank adapted for retaining the glassy melt and for inertization of hazardous substances by vitrification, said tank also including an outlet in the form of an overflow channel which extends radially from said tank and which can be heated;

introducing non-flammable charging material containing hazardous substances with metallic constituents and less than 10% by weight of carbon into at least one location in said tank;

supplying oxidizing gases into said glassy melt from a bottom of said tank; and heating said glassy melt with electrodes extending downwardly into an interior of said tank to render said charging material inert by vitrification with said glassy melt.

13. A method according to claim 12, wherein said step of supplying said oxidizing gases includes introducing said oxidizing gases into said tank vertically below said at least one location where said charging material is introduced into said tank.

* * * * *